L. BARRON.
Combined Checks and Martingales.

No. 154,824. Patented Sept. 8, 1874.

WITNESSES:
G. Mathys
Solon C. Kemon

INVENTOR:
Louis Barron
BY
ATTORNEYS.

UNITED STATES PATENT OFFICE.

LOUIS BARRON, OF WOODSTOCK, VERMONT.

IMPROVEMENT IN COMBINED CHECKS AND MARTINGALES.

Specification forming part of Letters Patent No. 154,824, dated September 8, 1874; application filed June 16, 1874.

*To all whom it may concern:*

Be it known that I, LOUIS BARRON, of Woodstock, in the county of Windsor and State of Vermont, have invented a new and Improved Combined Check and Martingale; and I do hereby declare that the following is a full, clear, and exact description of the same, reference being had to the accompanying drawing, forming a part of this specification, in which—

Figure 1:
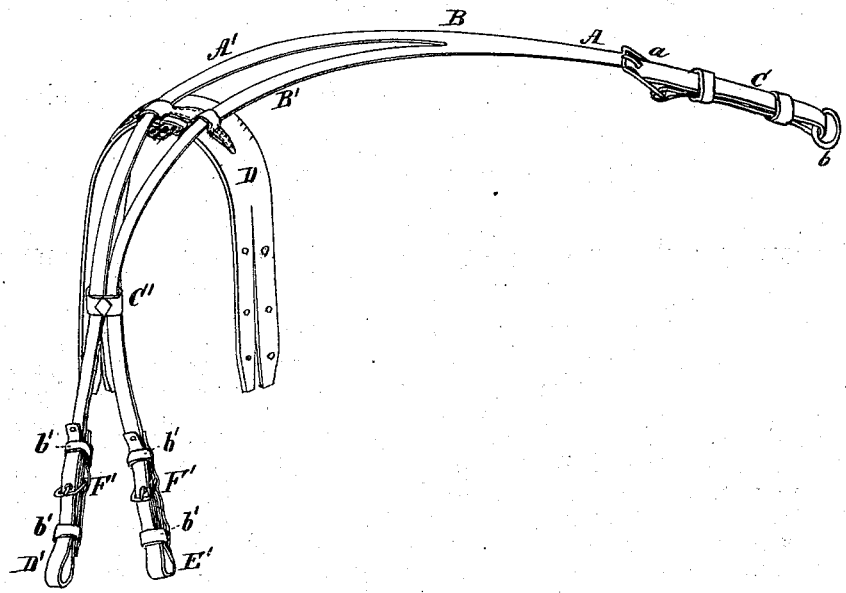
Figure 2:
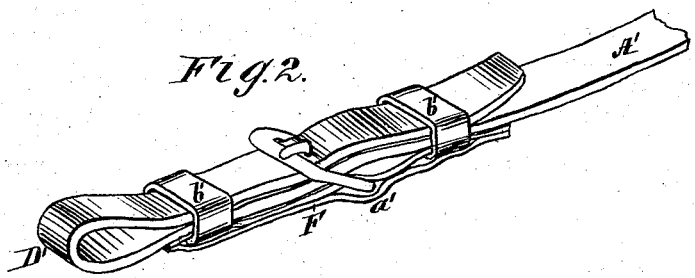

Figure 1 is a perspective view of combined check and martingale, when used as a check; Fig. 2, a perspective view of the detachable fastening for forming a loop in the end of the rein.

This invention relates to that class of harness which is used in connection with other parts of the gear as a check-rein, and consists in a new arrangement of parts, whereby the object is accomplished to great advantage, and the apparatus changed to a martingale, when desired, by a very simple adjustment.

In the drawing, A represents a strap split at B into two smaller straps or reins, and having at one end the adjustable loop C, provided with a buckle, $a$, and a ring, $b$, for fastening to the check-hook. D represents the crown-piece of the head-stall of an ordinary bridle, through which the small reins A' B' pass, sliding through the same some distance apart, and held in place by keepers attached to said crown-piece. C' is a loop for holding the two reins A' B' together upon the face of the horse, for the purpose of keeping them out of his eyes, and also preventing them from slipping down upon the horse's cheeks and thereby losing their efficiency as a check. Said loop is adjustable, and may be elevated or lowered, as desired. D' E' are loops in the ends of the reins A' B', which are fastened in the opposite sides of the bridle-bit. Said loops are simple continuations of the reins A' B', folded back and held by the adjustable fastening F'. Said fastening consists of a piece, $a'$, having a buckle permanently attached in the middle of it, and keepers $b'$ $b'$ on each side of it.

The operation of this combined check-rein and martingale is as follows: When used as a check, the reins A' B' are run through the keepers in the crown-piece of the bridle, the sliding loop C' put on and adjusted to suit the horse, the loops D' E' fastened into the bit, and the ring $b$ into the check-hook of the saddle, the rein being adjusted to the size of the horse by the buckle $a$. By means of this arrangement we have a rein that does not wear the mane, nor get tangled in the same by reason of its freedom from buckles, and is a desirable one on account of its simplicity and cheapness of construction. To use the check as a martingale, the detachable fastenings F' are taken off, and the reins A' B' drawn out from the loop C' and the crown-piece D, there being no buckles to obstruct said withdrawal. The pieces F' are then attached and the loops D' E' made fast to the opposite sides of the bridle-bit. The part A is then passed between the horse's front legs and the ring $b$ made fast to the girth, the buckle $a$ serving as an adjustment, as in the first instance.

Having thus described my invention, what I claim as new is—

The combination of the strap A split into two reins, A' B', with the loop C', and the detachable fastenings F', for the purpose of adapting the same to be used either as a check or martingale, substantially as and for the purpose specified.

LOUIS BARRON.

Witnesses:
F. N. BILLINGS,
WM. J. BOYCE.